(12) United States Patent
Williams et al.

(10) Patent No.: US 8,307,937 B2
(45) Date of Patent: Nov. 13, 2012

(54) STEERING APPARATUS

(75) Inventors: Daniel E. Williams, Lebanon, IN (US); Mark Cartwright, West Lafayette, IN (US)

(73) Assignee: TRW Automotive U.S. LLC, Livonia, MI (US)

( * ) Notice: Subject to any disclaimer, the term of this patent is extended or adjusted under 35 U.S.C. 154(b) by 349 days.

(21) Appl. No.: 12/704,555

(22) Filed: Feb. 12, 2010

(65) Prior Publication Data

US 2011/0198146 A1 Aug. 18, 2011

(51) Int. Cl.
*B62D 7/14* (2006.01)
*B62D 5/06* (2006.01)

(52) U.S. Cl. ......................................... 180/414
(58) Field of Classification Search .............. 180/414, 180/415
See application file for complete search history.

(56) References Cited

U.S. PATENT DOCUMENTS

| | | | |
|---|---|---|---|
| 2,833,602 A | 5/1958 | Bayer | |
| 3,653,298 A | 4/1972 | Bilodeau | |
| 4,770,264 A | 9/1988 | Wright et al. | |
| 4,781,262 A * | 11/1988 | Nakamura et al. | 180/414 |
| 4,893,690 A * | 1/1990 | Mori et al. | 180/414 |
| 4,953,648 A | 9/1990 | Ohmura | |
| 4,978,131 A | 12/1990 | Edahiro et al. | |
| 5,003,480 A | 3/1991 | Mori et al. | |
| 5,014,602 A | 5/1991 | Iwata | |
| 5,147,008 A * | 9/1992 | Nishimore et al. | 180/414 |
| 5,236,057 A | 8/1993 | Takehara et al. | |
| 5,577,436 A | 11/1996 | Kimbara | |
| 6,019,026 A * | 2/2000 | Williams et al. | 92/62 |
| 6,546,322 B2 | 4/2003 | Williams | |
| 6,945,350 B2 | 9/2005 | Szabela et al. | |
| 7,401,677 B2 | 7/2008 | Boyle et al. | |
| 7,685,928 B2 * | 3/2010 | Fox | 92/13 |
| 2007/0095598 A1 | 5/2007 | Williams | |
| 2007/0144818 A1 | 6/2007 | Sherwin | |

* cited by examiner

*Primary Examiner* — Kevin Hurley
(74) *Attorney, Agent, or Firm* — Tarolli, Sundheim, Covell & Tummino LLP (57) ABSTRACT

An improved apparatus (30) for steering rear wheels (16, 18) of a vehicle (10) includes hydraulic motor (34) having chambers (56, 58) which hold hydraulic fluid. An increase in fluid pressure in one of the chambers turns the steerable rear wheels of the vehicle in a first direction. An increase in fluid pressure in another one of the chambers turns the steerable rear wheels in a second direction. A control valve (36) is connected in fluid communication with the chambers (56, 58) of the hydraulic motor. The control valve (36) is free of a return flow of hydraulic fluid from the motor (34). A return conduit (134) is connected with the chambers (56, 58) and conducts a flow of hydraulic fluid to a reservoir (116) along a path which is spaced from the control valve (36). The motor (34) may include springs (70, 72) which are disposed in the chambers (56, 58) of the motor. Biasing sleeves (76, 78) are effective to transmit force from the springs to a piston (62).

19 Claims, 4 Drawing Sheets

STEERING APPARATUS

TECHNICAL FIELD

The present invention relates to a vehicle steering apparatus. More specifically, the present invention relates to an apparatus for use in steering rear wheels of a vehicle which has front wheels which are steered in response to turning of a steering wheel.

BACKGROUND OF THE INVENTION

Known vehicle steering systems have included one apparatus for use in steering the front wheels of a vehicle and another apparatus for use in turning steerable rear wheels of a vehicle. Known devices for turning steerable rear wheels of a vehicle are disclosed in U.S. Pat. No. 6,945,350 and U.S. Published Patent Application No. 2007/0144818. Apparatus for use in turning steerable front wheels of a vehicle is disclosed in U.S. Published Patent Application No. 2007/0095598.

When a vehicle is proceeding straight ahead, it is desirable to have steerable rear wheels of the vehicle in an initial or straight ahead condition. Upon turning of the steerable front wheels of a vehicle, it may be desired to effect turning movement of steerable rear wheels of the vehicle. Upon movement of the steerable front wheels of the vehicle back to their initial or straight ahead condition, it may also be desired to have the steerable rear wheels of the vehicle return to their initial or straight ahead condition.

SUMMARY OF THE INVENTION

The present invention relates to an apparatus for use in steering rear wheels of a vehicle having front wheels which are steered in response to movement of a steering wheel. The apparatus includes a hydraulic motor which is connected with the rear wheels of the vehicle. A control valve is connected in fluid communication with a pump and with chambers in the hydraulic motor. The control valve is free of a return flow of hydraulic fluid from the motor. A conduit conducts a return flow of hydraulic fluid from chambers of the motor to a reservoir along a flow path which is spaced from the control valve.

Although the hydraulic motor may have any one of many different constructions, the hydraulic motor advantageously includes biasing sleeves which are effective to transmit force from springs to a piston. During turning movement of the steerable vehicle wheels in a first direction, the first biasing sleeve is ineffective to transmit force from the first spring to the piston while the second biasing sleeve is effective to transmit force from the second spring to the piston. Similarly, during turning movement of the steerable rear wheels of the vehicle in the second direction, the first biasing sleeve is effective to transmit force from the first spring to the piston and the second biasing sleeve is ineffective to transmit force from the second spring to the piston. The biasing sleeves may have head end portions which are engageable with stop surfaces to limit movement of the biasing sleeves. If desired, the stop surfaces may be disposed on opposite ends of an intermediate sleeve.

BRIEF DESCRIPTION OF THE DRAWINGS

The foregoing and other features of the present invention will become more apparent to those skilled in the art to which the present invention relates upon reading the following description with reference to the accompanying drawings, in which.

DESCRIPTION ONE SPECIFIC EMBODIMENT OF THE INVENTION GENERAL DESCRIPTION

Figure 1:
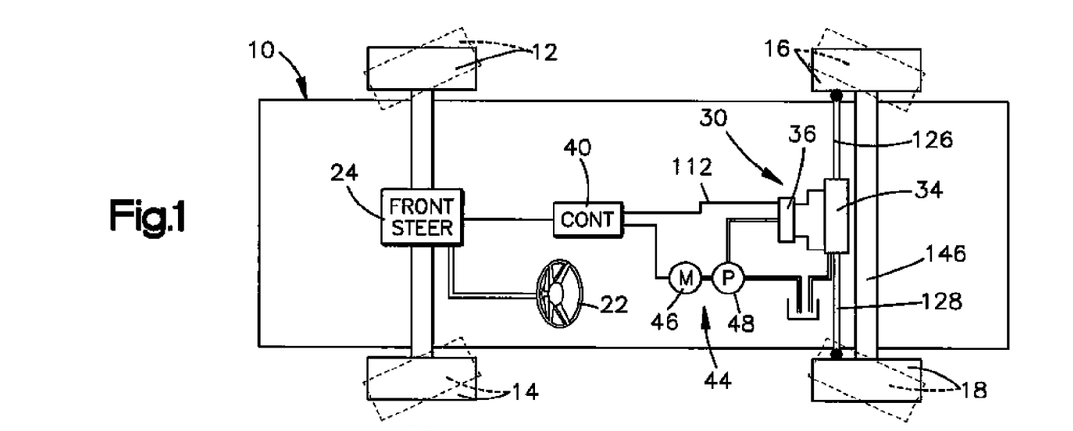
FIG. 1 is a schematic illustration depicting a vehicle having front wheels which are turned in response to movement of a steering wheel and steerable rear wheels.

A vehicle 10, such as an automobile or truck, is illustrated schematically in FIG. 1. The vehicle 10 includes steerable front wheels 12 and 14. In addition, the vehicle 10 has steerable rear wheels 16 and 18.

A steering wheel 22 is connected with a front steering gear 24. The front steering gear 24 is connected with the steerable front wheels 12 and 14 in a known manner. If desired, the front steering gear 24 may be of the rack and pinion type. Alternatively, the front steering gear 24 may be of the well-known integral type.

In order to facilitate turning of the steerable front wheels 12 and 14 of the vehicle 10, the front steering gear 24 may include a motor. The motor in the front steering gear 24 may be a hydraulic motor. Alternatively, the motor for the front steering gear 24 may be an electric motor. If desired, a combination of electric and hydraulic motors may be utilized in the front steering gear.

A rear wheel steering gear 30 (FIG. 1) is operable to turn the steerable rear wheels 16 and 18 of the vehicle 10 during turning of the steerable front wheels 12 and 14. The rear wheel steering gear 30 includes a hydraulic motor 34 which is connected with the steerable rear wheels 16 and 18. A valve 36 is provided to control the operation of the hydraulic motor 34. A controller 40 is connected with the front steering gear 24 and the rear wheel steering gear 30 by suitable electrical conductors.

The rear wheel steering gear 30 includes a variable flow device 44. The variable flow device 44 includes a variable speed electric motor 46 which drives a pump 48. The controller 40 controls the operation of the motor 46 and the flow of hydraulic fluid from the pump 48 to the valve 36. There is a continuous flow of hydraulic fluid from the pump 48 through the valve 36 and hydraulic motor 34. The rate of flow of hydraulic fluid from the pump 48 varies as a function of the speed of operation of the motor 46.

The controller 40 controls operation of the valve 36 and motor 46 as a function of turning of the steerable front wheels 12 and 14 of the vehicle 10. If desired, the controller 40 may control operation of the valve 36 and/or motor 46 as a function of other variables, such as vehicle speed, steering wheel angle, and/or lateral acceleration of the vehicle. Of course, the controller 40 may control operation of the valve 36 and/or motor 46 as a function of other variables if desired.

When the vehicle 10 is proceeding in a straight ahead direction, the steerable front wheels 12 and 14 are in the straight ahead condition illustrated in solid lines in FIG. 1. The steerable rear wheels 16 and 18 are also in the straight ahead condition illustrated in solid lines in FIG. 1. The hydraulic motor 34 is connected with the steerable rear wheels 16 and 18 and is effective to retain them in the straight ahead condition illustrated in solid lines in FIG. 1 while the front wheels 12 and 14 are in the straight ahead condition. The motor 46 continuously drives the pump 48 so that there is a continuous flow of hydraulic fluid through the valve 36 and hydraulic motor 34. When the front wheels 12 and 14 are in the straight ahead condition, the motor 46 may drive the pump 48 at a relatively slow speed.

Upon turning movement of the steerable front wheels in response to rotation of the steering wheel, the steerable front wheels are turned from the straight ahead condition to a turning condition, such as the turning condition illustrated in dashed lines in FIG. 1. As the front wheels 12 and 14 are turned, the controller 40 effects operation of the valve 36 to operate the hydraulic motor 34 to turn the steerable rear wheels 16 and 18. If desired, the controller 40 may increase the speed of operation of the motor 46 and the rate at which hydraulic fluid is supplied by the pump 48 as the front wheels 12 and 14 are turned. As the motor 34 is operated, the steerable rear wheels 16 and 18 may be turned to the positions indicated schematically in dashed lines in FIG. 1.

Upon completion of a steering maneuver, the steering wheel 22 and steerable front wheels 12 and 14 are returned to their straight ahead condition. At the same time, the controller 40 effects operation of the valve 36 to operate the hydraulic motor 34 to return the steerable rear wheels 16 and 18 to the straight ahead condition illustrated in solid lines in FIG. 1. The hydraulic motor 34 is effective to maintain the steerable rear wheels 16 and 18 in their straight ahead positions until another turning maneuver is undertaken.

Rear Wheel Steering Gear

The rear wheel steering gear 30 includes the valve 36 (FIG. 2) which is continuously supplied with hydraulic fluid from the pump 48 of the variable flow device 44. The hydraulic fluid flows from the pump 48 through the valve 36 to opposite variable volume motor cylinder chambers 56 and 58 in the hydraulic motor 34. There is a continuous flow of hydraulic fluid from the valve 36 through the motor cylinder chambers 56 and 58. A cylindrical piston 62 is disposed between the variable volume chambers 56 and 58.

Figure 2:
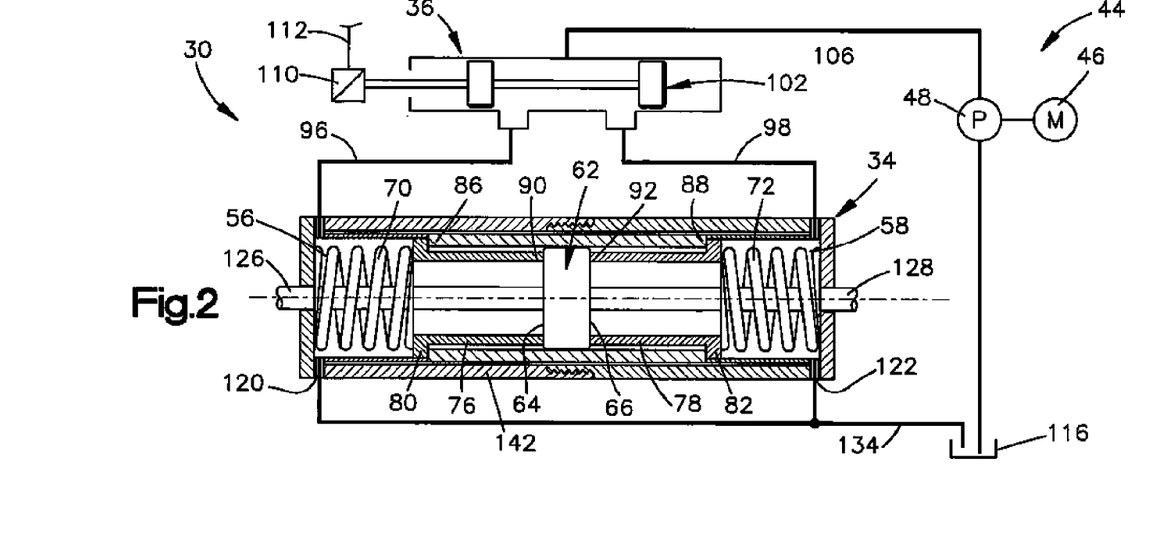
FIG. 2 is a schematic illustration depicting the construction of an apparatus which is used to turn the steerable rear wheels of the vehicle of FIG. 1 and illustrating the relationship between a hydraulic motor and control valve when the steerable rear wheels of the vehicle are in a straight ahead condition.

When the steerable rear wheels 16 and 18 are in the straight ahead condition illustrated in solid lines in FIG. 1, the valve 36 supplies fluid at equal pressures to the motor cylinder chambers 56 and 58 (FIG. 2). The equal fluid pressures are applied to equal areas on annular piston end surfaces 64 and 68. This results in the piston 62 being held in the centered or straight ahead position illustrated schematically in FIG. 2 by fluid pressure in the motor cylinder chambers 56 and 58. Biasing springs 70 and 72 are disposed in the motor cylinder chambers 56 and 58 to provide spring forces which urge the piston 62 to the centered or straight ahead position illustrated schematically in FIG. 2. The springs 56 and 58 are the same size and provide equal, but oppositely directed, biasing forces.

Force is transmitted from the springs 70 and 72 to the opposite end surfaces 64 and 66 of the piston 62 by identical biasing sleeves 76 and 78. When the piston 62 is in the centered or straight ahead position of FIG. 2, annular head end portions 80 and 82 of the generally cylindrical biasing sleeves 76 and 78 are disposed in engagement with the helical biasing springs 70 and 72. Annular end surfaces on force transmitting ends 90 and 92 of the biasing sleeves 76 and 78 are pressed against flat circular end surfaces 64 and 66 on the piston 62 by the springs 70 and 72. The generally cylindrical and equal length biasing sleeves 76 and 78 are disposed in the cylindrical motor chambers 56 and 58 in a coaxial relationship with the helical biasing springs 70 and 72 and the cylindrical piston 62.

The equal forces applied against the circular end surfaces 64 and 66 of the cylindrical piston 62 by the biasing sleeves 76 and 78 hold the piston 62 in the initial or straight ahead condition illustrated in FIG. 2. The steerable rear wheels 16 and 18 are held in the straight ahead positions illustrated schematically in solid lines in FIG. 1 by the combined influence of the equal fluid pressure forces applied against the piston 62 (FIG. 2) and the influence of the equal forces transmitted from the biasing springs 70 and 72 to the piston through the biasing sleeves 76 and 78.

When the steerable rear wheels 16 and 18 are in the straight ahead condition illustrated schematically in solid lines in FIG. 1, equal hydraulic fluid pressures are conducted from the valve 36 (FIG. 2) through conduits 96 and 98 to the coaxial cylindrical chambers 56 and 58 of the hydraulic motor 34. At this time, a valve spool 102 is in the centered condition illustrated in FIG. 2. The motor cylinder chamber conduits 96 and 98 and motor cylinder chambers 56 and 58 are connected in fluid communication with the pump 48 through a fluid supply conduit 106.

Both motor cylinder chambers 56 and 58 are continuously connected with a reservoir 116 through fixed orifices 120 and 122 (FIG. 2). The orifices 120 and 122 are sized so that continuous hydraulic fluid flows are conducted from the motor cylinder chambers 56 and 58 to the reservoir 116 when the valve 36 is in the straight ahead condition illustrated schematically in FIG. 2. This results in equal hydraulic fluid pressures being maintained in the equal sized and coaxial motor cylinder chambers 56 and 50.

Upon energization of the solenoid 110 to move the valve spool 102 toward the left (as viewed in FIG. 2) to an actuated condition, fluid flow from the valve 36 through the conduit 98 to the motor cylinder chamber 58 is decreased or substantially blocked. This results in a reduction in the fluid pressure in the motor cylinder chamber 58 as fluid continues to flow from the motor cylinder chamber 58 through the fixed orifice 122 to the reservoir 116. The resulting higher fluid pressure in the motor cylinder chamber 56 urges the piston 62 toward the right (as viewed in FIG. 2) against the influence of the spring 72. As this occurs, the controller 40 may increase the speed of operation of the motor 46 to increase the rate of fluid flow from the pump 48.

Figure 3:
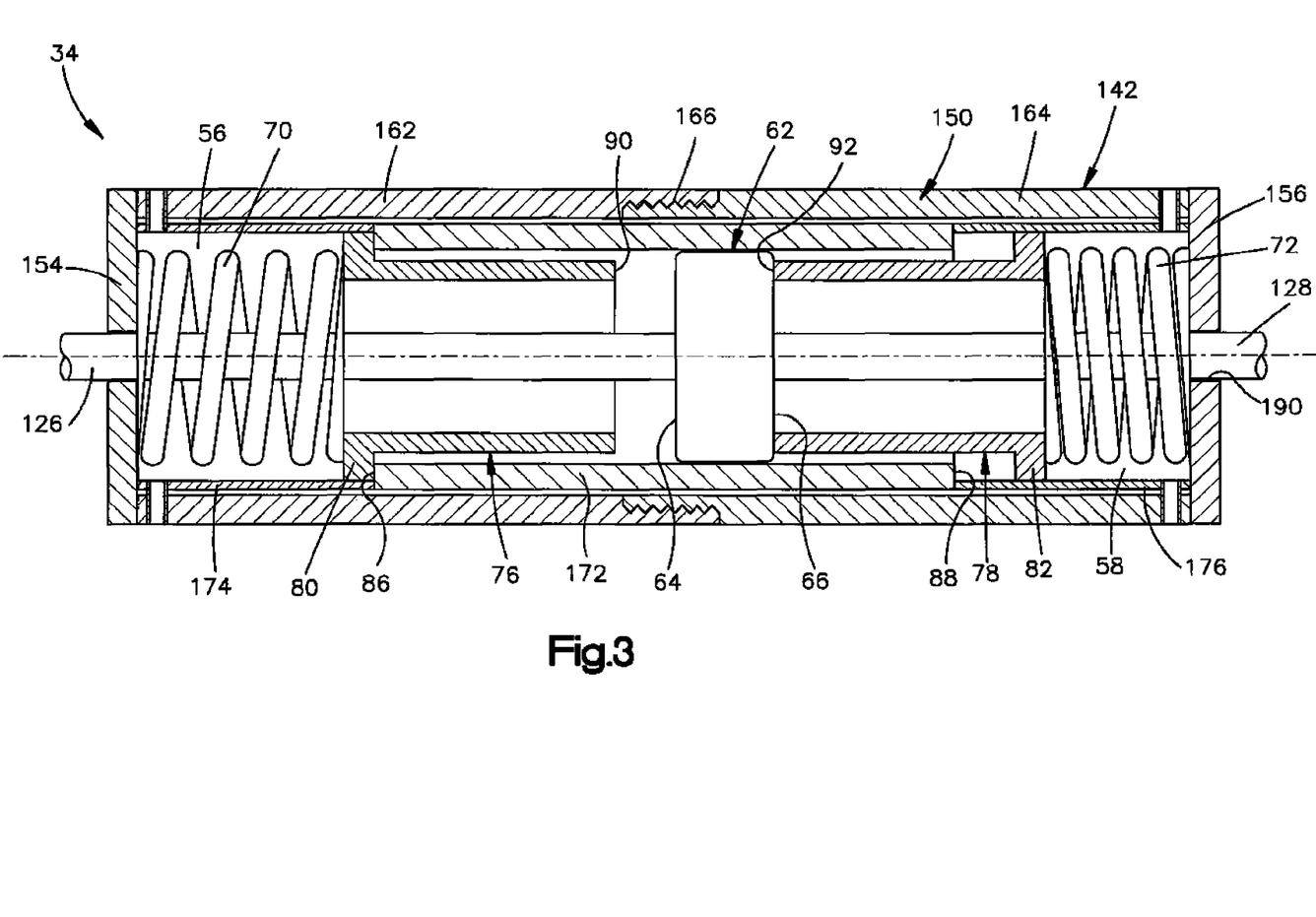
FIG. 3 is an enlarged schematic sectional view of the hydraulic motor of FIG. 2 and illustrating the manner in which the motor is actuated to turn the steerable vehicle wheels in a first direction.

The relatively high fluid pressure in the motor cylinder chamber 56 results in the piston 62 being moved to the right (as viewed in FIG. 2) to the position illustrated in FIG. 3. As the piston 62 moves to the right, coaxial force transmitting members 126 and 128 transmit force to the steerable rear wheels 16 and 18. This force effects turning movement of the steerable vehicle wheels 16 and 18 toward the positions illustrated in dashed lines in FIG. 1. The force transmitting members 126 and 128 are fixedly connected to and are coaxial with the piston 62.

The ends of the force transmitting members 126 and 128 are pivotally connected with a rear wheel steering linkage which is pivotally connected with the steerable rear wheels 16 and 18 (FIG. 1) in a known manner. The end of the force transmitting member 126 is pivotally connected with the steerable rear wheel 16. The end of the force transmitting member 128 is pivotally connected with the steerable rear wheel 18.

Similarly, when the steerable rear wheels 16 and 18 are to be turned in the opposite direction, the valve 36 is actuated by the solenoid 110 to move the valve spool toward the right (as viewed in FIG. 2). As this occurs, the flow of fluid through the conduit 96 to the motor cylinder chamber 56 is at least partially blocked. If desired, the control 40 may increase the speed of operation of the motor 46 upon initiation of turning of the steerable rear wheels 16 and 18.

Since the cylindrical motor cylinder chamber 56 is continuously connected with the reservoir 116 through the fixed orifice 120, the retarding of fluid flow through the conduit 96 to the motor cylinder chamber results in a decrease in the hydraulic fluid pressure in the motor cylinder chamber 56. However, the fluid pressure in the cylindrical motor cylinder chamber 58 remains substantially constant. Therefore, the piston 62 is moved to the left, toward the position illustrated in FIG. 4, under the influence of fluid pressure applied against the end surface 66 of the piston. As this occurs, the coaxial force transmitting members 126 and 128 are effective to turn the steerable vehicle wheels 16 and 18 from the straight ahead condition illustrated in solid lines in FIG. 1.

In the embodiment of the invention illustrated in FIG. 2, the fixed orifices 120 and 122 are of the same size. In addition, the conduits 96 and 98 which connect the valve 36 with the motor cylinder chambers 56 and 58 are the same size so that, when the valve spool is in the centered or initial condition of FIG. 2, equal continuous flows of hydraulic fluid are conducted through the conduits 96 and 98 to the motor cylinder chambers 56 and 58. In addition, equal fluid flows are conducted from the motor cylinder chambers 56 and 58 through the fixed orifices 120 and 122 to the reservoir 116. Therefore, equal fluid pressures are provided in the motor cylinder chambers 56 and 58 when the steerable rear wheels 116 and 118 are in the straight ahead condition. Although it is believed that it may be desired to have the valve 36 block fluid flow to either the motor cylinder chamber 56 or the motor cylinder chamber 58 upon actuation of the valve, it should be understood that fluid flow to one of the two motor cylinder chambers 56 or 58 may only be partially blocked while fluid flow to the other motor cylinder chamber is not retarded.

The variable flow device 44 includes the electric motor 46 which continuously drives the pump 48. Therefore, the pump 48 is continuously effective to supply hydraulic fluid under pressure to the valve 36. It is contemplated that the motor 46 may drive the pump at a constant speed so that a substantially constant hydraulic fluid pressure is maintained in the supply conduit 106 when the valve 36 is in the straight ahead condition of FIG. 2. However, when turning movement of the steerable rear wheels is to be undertaken, the controller 40 may increase the speed at which the motor 46 drives the pump 48 to thereby increase the hydraulic fluid pressure in one of the chambers 56 and 58.

When the solenoid 110 is operated to actuate the valve 36, fluid flow through one of the conduits 96 or 98 is retarded. However, fluid continues to flow through the fixed orifices 120 and 122 to the reservoir 116. This results in the fluid pressure in one of the motor cylinder chambers 56 or 58 decreasing while the fluid pressure is maintained or increased in the other motor cylinder chamber.

A return flow of fluid from the motor cylinder chambers 56 and 58 continuously is conducted directly to reservoir by a return conduit 134. The return fluid flow is conducted from the motor chambers 56 and 58 without being conducted through the valve 36. Therefore, the valve 36 is free of a return flow of hydraulic fluid from the motor to the reservoir 116. All of the fluid which is exhausted from the motor cylinder chambers 56 and/or 58 is conducted through the fixed orifices 120 and 122 and return conduit 134 directly to the reservoir without passing through the valve 36.

The rate of flow of hydraulic fluid from the pump 48 varies as a direct function of variations in the speed at which the motor 46 drives the pump. The fixed orifices 120 and 122 cause the fluid pressure in the motor chambers 56 and 58 to vary as a direct function of variations in the rate of flow of hydraulic fluid from the pump 48. Therefore, the fluid pressure in the motor chambers 56 and 58 will vary as a direct function of the speed at which the motor 46 drives the pump 48.

When the valve 36 is actuated to change the fluid pressure in a selected chamber 56 or 58 of the motor 34, the pressure in the selected chamber will vary as a direct function of the speed at which the motor 46 drives the pump 48. The fluid pressure force applied against the piston 62 will move the piston and force transmitting members 126 and 128. Movement of the piston 62 and force transmitting members 126 and 128 is resisted by one of the springs 70 or 72. The springs 70 and 72 have equal known spring constants which determine the distance through which the spring is compressed by a given fluid pressure in a selected one of the chambers 56 or 58. Movement of the force transmitting members 126 and 128 and turning movement of the steerable rear wheels 16 and 18 varies as a direct function of the distance through which a spring 70 or 72 is compressed. Therefore, the extent of turning movement of the steerable rear wheels varies as a direct function of the speed at which the motor 46 drives the pump 48.

The controller 40 effects operation of the motor 46 to drive the pump 48 at a speed corresponding to a desired extent of turning movement of the steerable rear wheels 16 and 18. Thus, for a given set of vehicle operating conditions, the controller 40 effects operation of the motor 46 at a speed which corresponds to a desired extent of compression of one of the springs 70 or 72 and turning movement of the steerable rear wheels 16 and 18. This eliminates the necessity of providing a sensor to sense the positions of the force transmitting members 126 and 128 in order to determine the extent of turning movement of the steerable rear wheels 16 and 18.

It is contemplated that it may be desired to determine the extent of turning movement of the steerable rear wheels 16 and 18 by ways other than controlling the speed of operation of the motor 46. For example, the extent of turning movement of the steerable rear wheels 16 and 18 may be determined by sensing the position of the force transmitting members 126 and 128 relative to the vehicle. As another example, the extent of turning movement of the steerable rear wheels 16 and 18 may be determined by sensing the fluid pressure in the motor chambers 56 and 58. Alternatively, the extent of turning movement of the steerable rear wheels 16 and 18 may be determined by sensing the flow rate of fluid in the fluid supply conduit 106.

Hydraulic Motor

Figure 4:
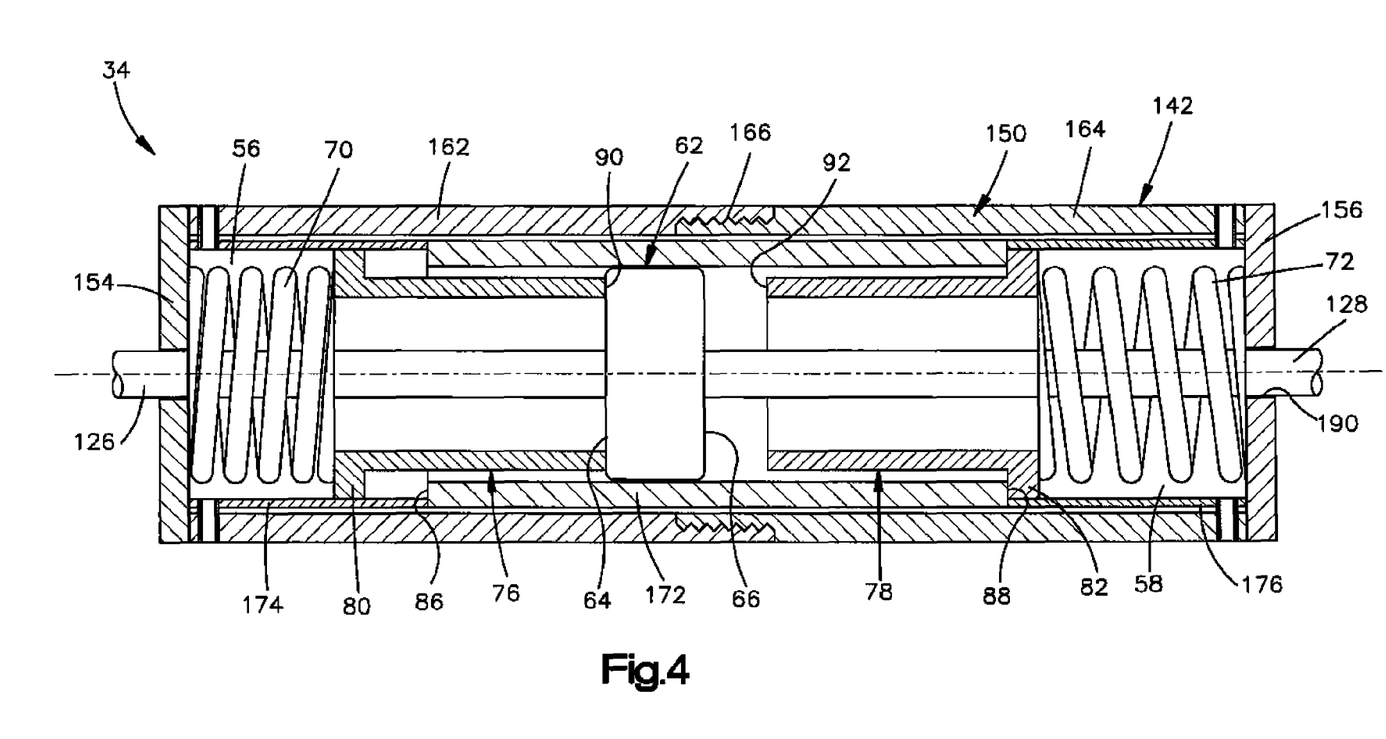
FIG. 4 is a schematic illustration, generally similar to FIG. 3, illustrating the hydraulic motor when the vehicle wheels are being turned in a second direction.

The motor 34 includes a housing 142 (FIGS. 3 and 4). The housing 142 is connected with a rear support member 146 (FIG. 1) of the vehicle 10 at a location between the steerable rear wheels 16 and 18. The valve 36 is connected with the housing 142 and the support member 146. Of course, the valve 36 may be mounted in a different manner if desired.

The housing 142 includes a side wall 150 (FIGS. 3 and 4). In addition, the motor 34 includes a left end wall 154 and a right end wall 156. The circular and equal area end walls 154 and 156 are fixedly connected to the side wall 150. Although the end walls 154 and 156 and side wall 150 may be interconnected in many different ways, in the illustrated embodiment of the invention the end walls 154 and 156 are welded to the side wall 150. Of course, the end walls 154 and 156 and side wall 150 may be interconnected in a different manner if desired. For example, mechanical connections, such as thread convolutions, may be utilized to interconnect the side wall 150 and end walls 154 and 156.

In the illustrated embodiment of the invention, the side wall 150 has a cylindrical configuration and the end walls 154 and 156 have circular configurations. However, the side wall 150 and/or end walls 154 and 156 may have a different configuration if desired. For example, the side wall 150 and/or end walls 154 and 156 may have a polygonal configuration.

In the illustrated embodiment of the invention, the side wall 150 (FIGS. 3 and 4) is formed in two sections, that is, a left section 162 and a right section 164. The two sections 162 and 164 are interconnected at a connection 166. In the illustrated embodiment of the invention, the connection 166 is a threaded connection. However, a different type of connection may be utilized if desired. For example, the two sections 162 and 164 of the side wall 150 may be welded together. Alternatively, the side wall 150 may be formed as one piece.

To facilitate construction and assembly of the motor 34, a plurality of coaxial cylindrical sleeves are provided inside the housing 142. An intermediate sleeve 172 is disposed in a central portion of the housing 142 midway between the end walls 154 and 156. Left and right end sleeves 174 and 176 (FIGS. 3 and 4) are disposed in engagement with opposite ends of the intermediate sleeve 172 and in engagement with the end walls 154 and 156 of the housing 142. The intermediate sleeve 172 and end sleeves 174 and 176 all have a cylindrical configuration and are disposed in the housing 142 in a coaxial relationship with the side wall 150 and the force transmitting members 126 and 128. The end walls 154 and 156 of the housing 142 retain the intermediate sleeve 172 and end sleeves 174 and 176 against axial movement relative to the side wall 150 of the housing 142. Suitable seals may be provided between the outer sides of the sleeves 172, 174 and 176 and a cylindrical inner side surface of the side wall 150.

The piston 62 has a cylindrical outer side surface which is disposed in engagement with and slides along a cylindrical inner surface of the intermediate sleeve 172. The end sleeves 174 and 176 extend around and are coaxial with the biasing springs 70 and 72. However, the biasing springs 70 and 72 are spaced from the cylindrical inner side surfaces of the end sleeves 174 and 176 to facilitate compression and expansion of the biasing springs. The cylindrical biasing springs 70 and 72 extend around and are coaxial with the force transmitting members 126 and 128.

When the steerable vehicle wheels 16 and 18 (FIG. 1) are to be turned in a first direction, the valve 36 is actuated to at least partially block fluid flow to the right motor cylinder chamber 58. The piston 62 is moved toward the right (as viewed in FIG. 3) under the influence of the fluid pressure in the left motor cylinder chamber 56. Similarly, when the steerable vehicle wheels 16 and 18 (FIG. 1) are to be turned in an opposite or second direction, the valve 36 is actuated to at least partially block fluid flow to the left motor cylinder chamber 56. Fluid pressure in the right motor cylinder chamber 58 moves the piston 62 toward the left (as viewed in FIG. 4) under the influence of fluid pressure in the right motor cylinder chamber 58.

During movement of the piston 62, force is transmitted through the coaxial force transmitting members 126 and 128 to a rear wheel steering linkage to turn the steerable rear wheels 16 and 18. During this movement of the piston 62, the intermediate sleeve 172 and end sleeves 174 and 176 remain stationary relative to the side wall 150 of the housing 142. As the piston 62 moves, one of the biasing sleeves 76 or 78 is stationary relative to the housing 142 while the other biasing sleeve moves with the piston.

Figure 5:
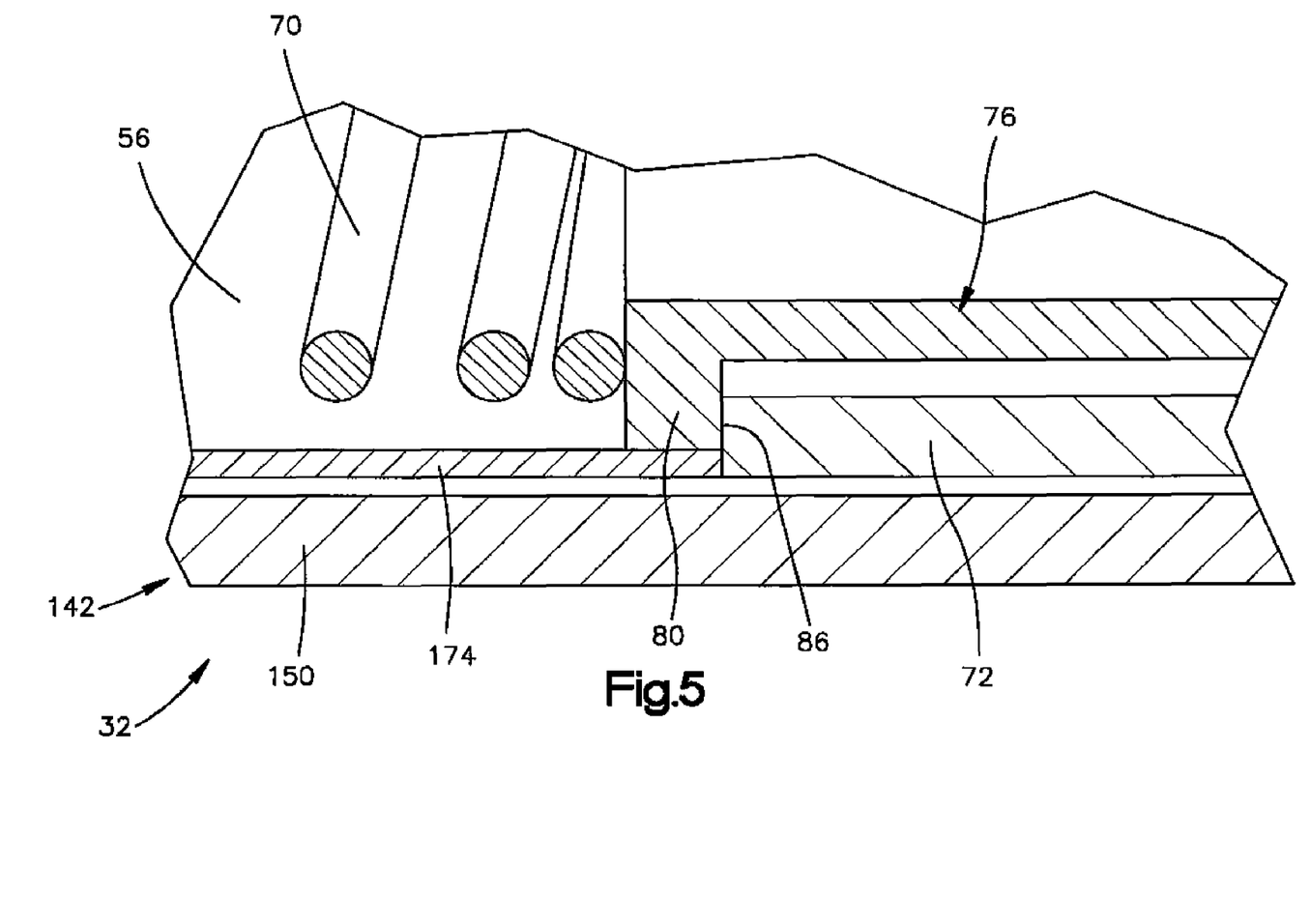
FIG. 5 is an enlarged schematic illustration of a portion of the hydraulic motor of FIGS. 2-4.

When the piston 62 is moved toward the right (FIG. 3) to turn the steerable rear wheels 16 and 18 in the first direction, the head end portion 82 of the biasing sleeve 78 is pressed against the spring 72 to compress the spring against the right end wall 156 of the housing 142. The head end portion 80 of the biasing sleeve 76 engages a stop 86 formed by an annular surface on the left (as viewed in FIGS. 3 and 5) end of the intermediate sleeve 172. The annular surface on the left (as viewed in FIGS. 3 and 5) end of the intermediate sleeve 172 engages both the right end of the sleeve 174 and the head end portion 80 of the biasing sleeve 76. If desired, the stop 86 may be formed by a surface other than the end of the intermediate sleeve 172. For example, one or more stop members may be mounted on the housing side wall 150.

The biasing sleeve 76 remains stationary relative to the side wall 150 of the housing 142 as the piston 62 moves toward the right (as viewed in FIG. 3) to effect turning of the steerable vehicle wheels 16 and 18 in the first direction. This results in the piston 62 moving away from the circular force transmitting end 90 of the biasing sleeve 76. The biasing sleeve 78 moves with the piston 62. Therefore, an increasing force is transmitting from the spring 72 through the biasing sleeve 78 to the piston 62 as the spring 72 is compressed. At this time, the biasing sleeve 76 is ineffective to transmit force to the piston 62.

When the steerable vehicle wheels 16 and 18 (FIG. 1) are to be turned in the second direction, fluid pressure in the right (as viewed in FIG. 4) motor cylinder chamber 58 moves the piston 62 leftward relative to the side wall 150 of the housing 142. As this occurs, the force transmitting members 126 and 128 transmit force to the rear wheel steering linkage to effect turning of the steerable vehicle wheels in the second direction, that is, a direction which is opposite to the first direction.

The leftward (as viewed in FIG. 4) movement of the piston 62 and biasing sleeve 76 presses the annular head end portion 80 of the biasing sleeve 76 against the spring 70. This results in the biasing spring 70 being compressed against the left end wall 154 of the housing 142. The piston 62 moves away from the force transmitting end portion 92 of the biasing sleeve 78. Therefore, the stationary biasing sleeve 78 is at this time, ineffective to transmit force to the piston 62. As this occurs, the force transmitting members 126 and 128 effect turning movement of the rear wheels 16 and 18 in the second direction.

When the valve 36 is again moved back to its initial or straight ahead position, illustrated schematically in FIG. 2, the fluid pressure in the motor cylinder chambers 56 and 58 equalize. When this occurs, the piston 62 is moved to its centered position in the housing 142 under the influence of the biasing springs 70 or 72. When the steerable rear wheels 16 and 18 are turned in the first direction by rightward (as viewed in FIG. 3) movement of the piston 62, the compressed biasing spring 72 provides the force which is transmitted through the biasing sleeve 78 to the piston 62 to move the piston back to the centered or straight ahead position illustrated schematically in FIG. 1. Similarly, when the piston 62 is moved leftward (as viewed in FIG. 4) in the housing 142 to turn the steerable rear wheels in the second direction, the biasing spring 70 transmits force through the biasing sleeve 76 to move the piston 62 back to the centered or straight ahead position of FIG. 1.

Assembly of the Motor

When the hydraulic motor 34 is to be assembled, one of the end sections, for example, the right end section 164 is utilized to position some of the components of the motor 34. At this time, the right end wall 156 is fixedly connected to the right section 164 of the side wall 150. Of course, the side wall 150 is not, at this time, connected with the valve 36 and/or the reservoir 116 (FIG. 2).

The right end sleeve 176 (FIGS. 3 and 4) is positioned in the right section 164 of the side wall 150 in engagement with the right end wall 156. The biasing spring 72 is then positioned in engagement with the right end wall 156 in a coaxial relationship with the right end sleeve 176. The circular head end portion 82 of the biasing sleeve 78 is then positioned in engagement with the biasing spring 72. The force transmitting member 128 is then moved through the biasing sleeve 78 and spring 72. The leading end of the force transmitting member then moves through an opening 190 in the right end wall 156.

Before the leading end of the force transmitting member 128 is moved through the biasing spring 78 and right end sleeve, the intermediate sleeve 172 is positioned around the piston. Therefore, as the force transmitting member 128 is moved into and through the right section 164 of the housing 142, the intermediate sleeve 172 and piston 62 are moved into the right section 164 of the housing. At this time, the spring 72 is in an uncompressed or free condition. Therefore, (the left as viewed in FIGS. 3 and 4) end of the spring 72 will extend beyond the left end of the right end sleeve 176.

As the piston 62 and intermediate sleeve 72 are moved into the right section 164 of the housing 142, the circular head end portion 82 of the biasing sleeve 78 will engage the helical spring 72. The force transmitting end portion 92 of the biasing sleeve 78 will engage the right end face 66 of the piston 62. The head end portion 82 of the biasing sleeve 78 will engage the annular right end surface on the intermediate sleeve 172. Engagement of the intermediate sleeve 172 with the cylindrical side surface of the side wall 150 will center the intermediate sleeve and piston 162 in a coaxial relationship with the right section 164 of the housing 142.

The biasing sleeve 76 is then positioned on the force transmitting member 126 and moved into a coaxial relationship with the intermediate sleeve 172 and piston 62. The helical spring 70 is then positioned on the force transmitting member 126 in engagement with the head end portion 80 of the biasing sleeve 76. The left end sleeve 174 is then positioned in a coaxial relationship with the biasing sleeve 76 and moved into engagement with the annular end surface on the intermediate sleeve 172.

The left section 162 of the housing 142 is moved into a telescopic relationship with the left end sleeve 174 and the left portion of the intermediate sleeve 172. At this time, both of the helical springs 70 and 72 will be in an uncompressed or free condition. The two housing sections 162 and 164 are then moved axially toward each other.

As this occurs, the head end portion 82 of the biasing sleeve 72 is pressed against the spring 72 to compress the spring against the right end wall 156 of the housing 142. The right (as viewed in FIGS. 3 and 4) end of the intermediate sleeve 172 is moved into engagement with the left (as viewed in FIGS. 3 and 4) end of the right end sleeve 176. At the same time, the head end portion 80 of the biasing sleeve 76 is pressed against the annular left end surface of the intermediate sleeve 172. The spring 72 is compressed as the left section 162 of the housing side wall 150 is moved toward the right section 164 of the housing side wall. The spring 70 is compressed between the head end portion 80 of the biasing spring 76 and the left end wall 154 of the housing 142.

When the left section 162 of the housing side wall 150 has been moved into engagement with the right section 164, the two housing side wall sections are rotated relative to each other to interconnect the housing sections at the connection 166. At this time, both of the springs 70 and 72 will be compressed and the piston 62 will be held in centered or straight ahead position of FIG. 2 by the biasing sleeves 76 and 78.

It should be understood that a motor 34 may be assembled in a different manner if desired. For example, the intermediate sleeve 172 may be positioned around the piston 62. The biasing spring 70, biasing sleeve 76 and end sleeve 174 may be positioned in the left housing section 162 in a telescopic relationship with the force transmitting member 126. Similarly, the biasing spring 72, biasing sleeve 78 and end sleeve 176 may be positioned in the right section 164 of the housing side wall 140. The two housing side wall sections 162 and 164 may then be moved toward each other and interconnected.

Alternatively, the side wall 150 may be formed as one piece and the components of the motor assembly positioned within the side wall. An end wall, for example, the right end wall 156 would then be connected to the side wall 150. As the end wall 156 is connected to the side wall 150, the springs 70 and 72 would be compressed. It should be understood that many different methods and orders of assembly may be utilized during construction of the motor 34. It should also be understood that the motor 34 may have a construction other than the specific construction described and illustrated herein.

Having described the invention, the following is claimed:

1. An apparatus for use in steering rear wheels of a vehicle which has front wheels which are steered in response to turning of a steering wheel; said apparatus comprising:
    a pump connected in fluid communication with a reservoir,
    a hydraulic motor connected with the rear wheels of the vehicle, said hydraulic motor including a first chamber which holds hydraulic fluid and a second chamber which holds hydraulic fluid, each one of said first and second chambers including a hydraulic fluid inlet through which fluid flows into said one of said first and second chambers and a hydraulic fluid outlet through which hydraulic fluid flows from said one of said first and second chambers, an increase in fluid pressure in the first chamber acting to turn the steerable rear wheels of the vehicle in a first direction and an increase in fluid pressure in the second chamber acting to turn the steerable rear wheels of the vehicle in a second direction;
    a control valve which is connected in fluid communication with said pump and with said inlets to said first and second chambers of said hydraulic motor, said control valve directing fluid to at least one of said first and second chambers to steer the rear wheels of the vehicle in response to turning of the steering wheel, said control valve being free of a return flow of hydraulic fluid from said motor to the reservoir when said control valve directs fluid to the at least one of said first and second chambers; and
    a conduit which is connected with the hydraulic fluid outlets from the first and second chambers and which conducts a flow of hydraulic fluid from the hydraulic fluid outlets to the reservoir along a flow path which is spaced from said control valve.

2. An apparatus as set forth in claim 1 wherein said hydraulic motor includes a motor housing which encloses a piston disposed between the first and second chambers and a force transmitting member which is connected with said piston and with the steerable rear wheels of the vehicle, a first spring which urges said piston in a first direction toward an initial position corresponding to a straight ahead condition of the steerable rear wheels of the vehicle, a second spring which urges said piston in a second direction toward the initial position corresponding to the straight ahead condition of the steerable rear wheels of the vehicle, said piston being disposed between said first and second springs when said piston is in the straight ahead condition.

3. An apparatus as set forth in claim 1 further including a motor which is connected with said pump and is operable to drive said pump, and a controller which is connected with said motor and is operable to vary motor operating speed to obtain a fluid pressure corresponding to a desired extent of turning movement of the steerable rear wheels of the vehicle.

4. An apparatus as set forth in claim 1 wherein said hydraulic motor includes a housing, a piston which is disposed in said housing between said first and second chambers, a first force transmitting member which extends from said piston through a first end wall of said housing, said first force transmitting member having an end portion connected with a first steerable rear wheel of the vehicle, a second force transmitting member which extends from said piston through a second end wall of said housing, said second force transmitting member having an end portion connected with a second steerable rear wheel of the vehicle, a first spring is disposed in said first chamber in a spaced apart relationship with said piston, a second spring is disposed in said second chamber in a spaced apart relationship with said piston, said first spring extends around a portion of said first force transmitting member which is disposed in said first chamber, said second spring extends around a portion of said second force transmitting member which is disposed in said second chamber, said first spring being effective to provide force which is applied against said piston during movement of said piston to turn the steerable vehicle wheels in the second direction, said first spring being ineffective to provide force which is applied against said piston during movement of said piston to turn the steerable vehicle wheels in the first direction, said second spring being effective to provide force which is applied against said piston during movement of said piston to turn the steerable vehicle wheels in the first direction, said second spring being ineffective to provide force which is applied against said piston during movement of said piston to turn the steerable vehicle wheels in the second direction.

5. An apparatus as set forth in claim 1 wherein said hydraulic motor includes a housing having a side wall, a first end wall connected to a first end portion of said side wall, and a second end wall connected to a second end portion of said side wall, a piston disposed within said housing, a first force transmitting member which extends from said piston through said first end wall, said first force transmitting member having an end portion connected with a first steerable rear wheel of the vehicle, a second force transmitting member which extends from said piston through said second end wall, said second force transmitting member having an end portion connected with a second steerable rear wheel of the vehicle, a first spring disposed in said housing and spaced apart from said piston, a first biasing sleeve disposed in said housing, said first biasing sleeve being effective to transmit force from said first spring to said piston during turning of the steerable rear wheels of the vehicle in the second direction, a second biasing sleeve disposed in said housing, said second biasing sleeve being effective to transmit force from said second spring to said piston during turning of the steerable rear wheels of the vehicle in the first direction.

6. An apparatus as set forth in claim 5 wherein said first biasing sleeve is disposed in said first chamber of said hydraulic motor and extends around said first force transmitting member, said first spring being disposed in said first chamber of said hydraulic motor and extends around said first force transmitting member, said second biasing sleeve is disposed in said second chamber of said hydraulic motor and extends around said second force transmitting member, said second spring being disposed in said second chamber of said hydraulic motor and extends around said second force transmitting member.

7. An apparatus as set forth in claim 5 wherein said first biasing sleeve includes a first end portion which is disposed in engagement with said piston during turning of the steerable rear wheels of the vehicle in the second direction, said first end portion of said first biasing sleeve being spaced from said piston during turning of the steerable rear wheels of the vehicle in the first direction, said second biasing sleeve includes a first end portion which is disposed in engagement with said piston during turning of the steerable rear wheels of the vehicle in the first direction, said first end portion of said second biasing sleeve being spaced from said piston during turning of the steerable rear wheels of the vehicle in the second direction.

8. An apparatus as set forth in claim 1 wherein said hydraulic motor includes a housing having a side wall, a first end wall connected to a first end portion of said side wall, and a second end wall connected to a second end portion of said side wall, a piston which is disposed in said housing betweens said first and second chambers, a first force transmitting member which extends from said piston through said first end wall, a second force transmitting member which extends from said piston through said second end wall, a first spring disposed in said first chamber and extending around said first force transmitting member, a second spring disposed in said second chamber and extending around said second force transmitting member, a first biasing sleeve disposed in said first chamber and extending around said first force transmitting member, said first biasing sleeve being disposed between said first spring and said piston, a second biasing sleeve disposed in said second chamber and extending around said second force transmitting member, said second biasing sleeve being disposed between said second spring and said piston, a first stop surface connected with said housing and disposed in said first chamber, said first stop surface and said first biasing sleeve being engagable to limit movement of said first biasing sleeve relative to said housing during turning movement of the steerable rear wheels of the vehicle in the first direction, a second stop surface connected with said housing and disposed in said second chamber, said second stop surface and said second biasing sleeve being engagable to limit movement of said second biasing sleeve relative to said housing during turning movement of the steerable rear wheels of the vehicle in the second direction.

9. An apparatus as set forth in claim 1 wherein said hydraulic motor includes a housing having a side wall, a first end wall connected to a first end portion of said side wall, and a second end wall connected to a second end portion of said side wall, a piston which is disposed in said housing between said first and second chambers, a first force transmitting member which extends from said piston through said first chamber and said first end wall, a second force transmitting member which extends from said piston through said second chamber and said second end wall, an intermediate sleeve which extends around said piston and is disposed between said piston and said side wall of said housing, a first end sleeve which is disposed in said housing between said intermediate sleeve and said first end wall of said housing, a second end sleeve which is disposed in said housing between said intermediate sleeve and said second end wall of said housing, a first spring disposed in said first chamber and extending around a portion of said first force transmitting member, said first end sleeve extends around at least a portion of said first spring, a second spring disposed in said second chamber and extending around a portion of said second force transmitting member, said second end sleeve extends around at least a portion of said second spring, a first biasing sleeve disposed between said first spring and said piston and extending around a portion of said first force transmitting member, said intermediate sleeve extends around a portion of said first biasing sleeve during movement of said piston to turn the steerable vehicle wheels in the first direction, said first end sleeve extends around a portion of said first biasing sleeve during movement of said piston to turn the steerable vehicle wheels in the second direction, a second biasing sleeve disposed between said second spring and said piston and extending around a portion of said second force transmitting member, said intermediate sleeve extends around a portion of said second biasing sleeve during movement of said piston to turn the steerable vehicle wheels in the second direction, said second end sleeve extends around a portion of said second biasing sleeve during movement of said piston to turn the steerable vehicle wheels in the first direction.

10. An apparatus as set forth in claim 9 wherein said first biasing sleeve is effective to transmit force from said first spring to said piston during movement of said piston to turn the steerable vehicle wheels in the second direction, said first biasing sleeve is ineffective to transmit force from said first spring to said piston during movement of said piston to turn the steerable vehicle wheels in the first direction, said second biasing sleeve being effective to transmit force from said second spring to said piston during movement of said piston to turn the steerable vehicle wheels in the first direction, said second biasing sleeve is ineffective to transmit force from said second spring to said piston during movement of said piston to turn the steerable vehicle wheels in the second direction.

11. An apparatus as set forth in claim 9 wherein said first biasing sleeve has a head end portion which is engagable with said intermediate sleeve to limit movement of said first biasing sleeve during movement of said piston to turn the steerable vehicle wheels in the first direction, said second biasing sleeve having a head end portion which is engagable with said intermediate sleeve to limit movement of said second biasing sleeve during movement of said piston to turn the steerable vehicle wheels in the second direction.

12. An apparatus as set forth in claim 11 wherein said first end sleeve has an end surface which engages a first end surface on said intermediate sleeve, said second end sleeve having an end surface which engages a second end surface on said intermediate sleeve.

13. An apparatus as set forth in claim 1 wherein said control valve directs a continuous flow of fluid to said hydraulic motor.

14. An apparatus as set forth in claim 1 wherein said valve directs a continuous flow of fluid through said hydraulic motor to said reservoir.

15. An apparatus as set forth in claim 1 wherein said hydraulic fluid inlets only direct fluid flow into said first and second chambers.

16. An apparatus as set forth in claim 1 wherein said hydraulic fluid outlets only direct fluid flow from said first and second chambers.

17. An apparatus as set forth in claim 1 wherein said first and second chambers are continuously connected in fluid communication with said reservoir.

18. An apparatus for use in steering rear wheels of a vehicle which has front wheels which are steered in response to turning of a steering wheel; said apparatus comprising:
a pump connected in fluid communication with a reservoir,
a hydraulic motor connected with the rear wheels of the vehicle, said hydraulic motor including a first chamber which holds hydraulic fluid and a second chamber which holds hydraulic fluid, each one of said first and second chambers including a hydraulic fluid inlet through which fluid flows into said one of said first and second chambers and a hydraulic fluid outlet through which hydraulic fluid flows from said one of said first and second chambers, an increase in fluid pressure in the first chamber acting to turn the steerable rear wheels of the vehicle in a first direction and an increase in fluid pressure in the second chamber acting to turn the steerable rear wheels of the vehicle in a second direction;
a control valve which is connected in fluid communication with said pump and with said inlets to said first and second chambers of said hydraulic motor, said control valve being free of a return flow of hydraulic fluid from said motor to the reservoir; and
a conduit which is connected with the hydraulic fluid outlets from the first and second chambers and which conducts a flow of hydraulic fluid from the hydraulic fluid outlets to the reservoir along a flow path which is spaced from said control valve;
wherein said hydraulic motor includes a motor housing which encloses a piston disposed between the first and second chambers and a force transmitting member which is connected with said piston and with the steerable rear wheels of the vehicle, a first spring which urges said piston in a first direction toward an initial position corresponding to a straight ahead condition of the steerable rear wheels of the vehicle, a second spring which urges said piston in a second direction toward the initial position corresponding to the straight ahead condition of the steerable rear wheels of the vehicle, said piston being disposed between said first and second springs when said piston is in the straight ahead condition; and
further including a first sleeve which is disposed in said first chamber of said hydraulic motor, said first sleeve having a first end portion which is engagable with a first side of said piston and a second end portion which is engagable with said first spring, and a second sleeve which is disposed in said second chamber of said hydraulic motor, said second sleeve having a first end portion which is engagable with a second side of said piston and a second end portion which is engagable with said second spring.

19. An apparatus as set forth in claim 18 further including a first stop which is engagable with said first sleeve to limit movement of said first sleeve in the first direction and a second stop which is engagable with said second sleeve to limit movement of said second sleeve in the second direction.

* * * * *